July 20, 1948. J. H. WILLIAMS 2,445,503
TWIN TIRES FOR MOTOR VEHICLES
Filed Sept. 21, 1944

INVENTOR.
John H. Williams
BY
Zoltan Holschek
ATTORNEY

Patented July 20, 1948

2,445,503

UNITED STATES PATENT OFFICE 2,445,503

TWIN TIRES FOR MOTOR VEHICLES

John H. Williams, St. Johns, Newfoundland, Canada

Application September 21, 1944, Serial No. 555,085

2 Claims. (Cl. 152—352)

This invention relates to new and useful improvements in twin tires for motor vehicles.

More specifically, the invention proposes the construction of a twin tire characterized by an outer casing of rubber having its interior divided into separate chambers with a tube disposed in each chamber in a manner to form a tire which will not go flat if the air escapes from one of the tubes permitting the vehicle to which it is applied to be driven without requiring immediate repairs to the deflated portion of the tire.

Still further, it is proposed to form the casing with a centrally located inwardly extending groove for separating the interior of the casing into separate chambers and to provide a filler within the casing disposed between the inner face of the groove and a remote wall of the casing in a manner to provide a surface against which the groove may be clamped to be retained in position against the outward pressure of the tubes when filled with air.

Another object of the invention proposes the provision of a novel means for clamping the groove in its operative position, with the means being so arranged that it may be controlled by the application of a simple hand tool from the outside of the casing.

It is a further object of this invention, to construct a twin tire for motor vehicles which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 3:
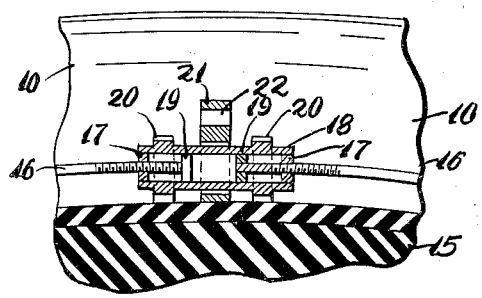
Fig. 3 is an enlarged partial longitudinal sectional view of Fig. 1.

The twin tires for motor vehicles, according to this invention, includes an outer casing 10 of conventional rubber construction. The outer casing 10 is formed with an inwardly extending groove 11 which divides the interior of the casing 10 into adjacent chambers 12 and 13. A conventional tire tube 14 is mounted in each of the chambers 12 and 13, and the tubes 14 are adapted to be filled with air in the conventional manner. Further details of the construction of the tubes 14 will not be given in this specification, as their construction and manner of use is generally known in the art, and the details thereof form no part of this invention.

Figure 2:
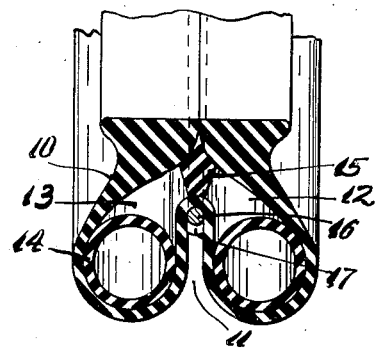
Fig. 2 is an enlarged vertical sectional view taken on the line 2—2 of Fig. 1.

A filler 15 of rubber is mounted within the casing 10 and disposed between the inner face of the groove 11 and a remote wall of the casing. The filler provides a surface against which the groove may be clamped to be held in position against the pressure of the air within the tubes 14 and in addition completes the separation of the chambers 12 and 13 as shown in Fig. 2.

Within the groove 11 means is provided for clamping the groove in position against the filler 15. This means comprises a length of wire 16 which is passed through lugs 27. The lugs 27 are integrally formed with the casing within the groove 11. The ends of the wire 16 are threaded and are threadedly passed through collars 27 mounted in the ends of a tube 18 so that the ends are disposed within the tube. The ends of the wire 16 are also formed with enlarged heads 19 located within the tube 18 which prevent the complete withdrawal of the ends of the wire from the tube.

Means is provided for turning the tube 18 to extend and retract the ends of the wire 16. This means is characterized by spaced gear teeth 20 formed on the tube 18. A bracket 21 is freely mounted on the tube 18 between the gear teeth 20, and is formed at its outer end with an opening 22.

Figure 1:
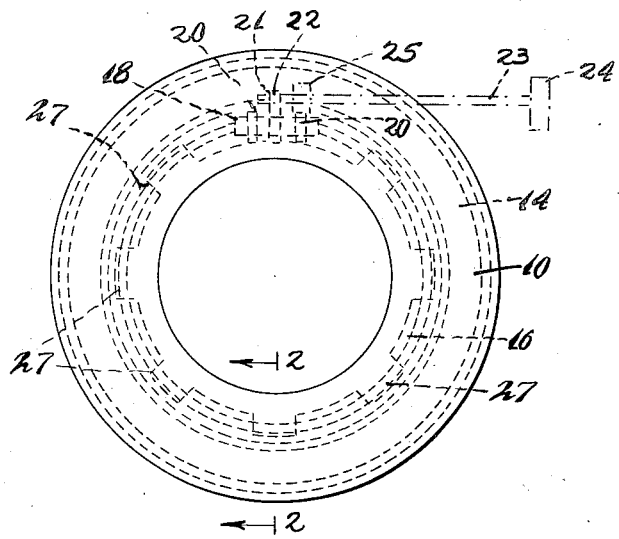
Fig. 1 is a side elevational view of a twin tire constructed in accordance with this invention.

A turning tool 23, illustrated by dot and dash lines in Fig. 1, is formed at one end with a handle 24, and is adapted to have its free end inserted into the opening 22 in bracket 21 to provide a center point about which the tool may be turned. A gear 25 is mounted upon the tool 23 at a location to mesh with one of the sets of gear teeth 20 formed on the tube 18 when the end of the tool 23 is engaged with the opening 22 from one side or the other of the bracket 21. Rotations of the handle 24 will then cause the tube 18 to be turned to extend or retract the ends of the wire 16 depending upon the direction in which the tool 23 is turned.

The manner of using the twin tire is as follows:

With the filler 15 removed each of the tubes 14 is engaged in position within its respective chamber 12 or 13. The filler 15 is then returned to its position with the casing 10 and the casing is placed in position on the wheel rim. The wire 16 is then tightened to securely clamp the groove 11 against the filler 15. The tubes 14 are then filled with air, and the wire 16 will prevent the casing 10 from being expanded to a position in which the groove will be forced out of its normal position.

The feature of the invention resides in the fact that the double tubes 14 permit the car to be driven if one of the tubes becomes deflated without requiring that the tire be immediately fixed.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. A twin pneumatic tire comprising two heavy rubber flanges adapted to fit in a wheel rim and to engage each other along their inner faces, a rubber wall connecting said flanges and including the tread of said tire, said wall having a middle portion extending inwardly toward but not to said flange inner faces, dividing the interior of said tire into two annular chambers, a separate annular rubber ring disposed between and in engagement with said middle portion and said flanges, closing one of said chambers from the other of said chambers, said middle portion including two spaced parts forming a groove therebetween, a rubber air-containing tube in each of said chambers, and means in said groove holding said middle portion against said ring.

2. A twin pneumatic tire comprising two heavy rubber flanges adapted to fit in a wheel rim and to engage each other along their inner faces, a rubber wall connecting said flanges and including the tread of said tire, said wall having a middle portion extending inwardly toward but not to said flange inner faces, dividing the interior of said tire into two annular chambers, a separate annular rubber ring disposed between and in engagement with said middle portion and said flanges, closing one of said chambers from the other of said chambers, said middle portion including two spaced parts forming a groove therebetween, a rubber air-containing tube in each of said chambers, and means in said groove holding said middle portion against said ring, said means including a wire engaging the bottom of said groove and a turnbuckle securing the ends of said wire together.

JOHN H. WILLIAMS.

REFERENCES CITED

The following references are of record in the file of this patent:

UNITED STATES PATENTS

| Number | Name | Date |
|---|---|---|
| 1,054,980 | Morgan | Mar. 4, 1913 |

FOREIGN PATENTS

| Number | Country | Date |
|---|---|---|
| 478,067 | France | 1915 |
| 582,904 | France | 1924 |